United States Patent
Lee et al.

(10) Patent No.: US 8,148,007 B2
(45) Date of Patent: Apr. 3, 2012

(54) ORGANIC ELECTROLYTE SOLUTION INCLUDING VINYL-BASED COMPOUND AND LITHIUM BATTERY USING THE SAME

(75) Inventors: Seok-soo Lee, Suwon-si (KR); Young-gyonn Ryu, Suwon-si (KR); Seung-sik Hwang, Seongnam-si (KR); Dong-joon Lee, Seoul (KR); Boris A. Trofimov, Irkutsk (RU)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 820 days.

(21) Appl. No.: 12/147,982

(22) Filed: Jun. 27, 2008

(65) Prior Publication Data

US 2009/0111028 A1 Apr. 30, 2009

(30) Foreign Application Priority Data

Oct. 26, 2007 (KR) .......................... 10-2007-108438

(51) Int. Cl.
*H01M 6/04* (2006.01)

(52) U.S. Cl. ........ 429/200; 429/330; 429/331; 429/332; 429/333; 429/334; 429/335; 429/199; 252/62.2; 252/364

(58) Field of Classification Search .................. 429/330, 429/331, 332, 333, 334, 335, 200, 199; 252/62.2, 252/364
See application file for complete search history.

(56) References Cited

U.S. PATENT DOCUMENTS 6,482,545 B1 * 11/2002 Skotheim et al. ............. 429/217

2008/0014496 A1 * 1/2008 Watanabe et al. ............. 429/129

FOREIGN PATENT DOCUMENTS

| IT | 1343534 | * | 12/2007 |
| WO | WO 01/03226 | * | 1/2001 |

OTHER PUBLICATIONS

Pantaloni et al. "Electrochemical characterization of a class of low temperature conducting polymer electrolytes", Electrochimica Acta (1989), 34 (5), 635-40. Article and abstract.*

* cited by examiner

*Primary Examiner* — Laura S. Weiner
(74) *Attorney, Agent, or Firm* — Lee & Morse, P.C.

(57) ABSTRACT

An organic electrolyte solution includes a lithium salt; an organic solvent including a high permittivity solvent and a low boiling solvent; and a vinyl-based compound represented by Formula 1 below, wherein m and n are each independently integers of 1 to 10; $X_1$, $X_2$, and $X_3$ each independently represent O, S, or $NR_9$; and $R_1$, $R_2$, $R_3$, $R_4$, $R_5$, $R_6$, $R_7$, $R_8$, and $R_9$ are represented in the detailed description. The organic electrolyte solution of the present invention and a lithium battery using the same suppress degradation of an electrolyte, providing improved cycle properties and life span thereof.

Formula 1:

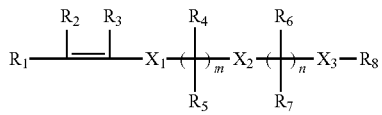

12 Claims, 3 Drawing Sheets

US 8,148,007 B2

ORGANIC ELECTROLYTE SOLUTION INCLUDING VINYL-BASED COMPOUND AND LITHIUM BATTERY USING THE SAME

CROSS-REFERENCE TO RELATED APPLICATIONS

This application claims the benefit of Korean Patent Application No. 2007-108438, filed on Oct. 26, 2007, in the Korean Intellectual Property Office, the disclosure of which is incorporated herein by reference.

BACKGROUND OF THE INVENTION

1. Field of the Invention

Aspects of the present invention relate to an organic electrolyte solution including a vinyl-based compound and a lithium battery using the same, and more particularly, to an organic electrolyte solution including a vinyl-based compound which can suppress degradation of electrolytes, and a lithium battery using the organic electrolyte solution to improve cycle properties and life span.

2. Description of the Related Art

As portable electronic devices, such as video cameras, mobile phones, and notebook PCs, become lighter and more functional, much research has been dedicated to batteries for such devices. Particularly, because chargeable secondary lithium batteries have energy density per unit weight about 3 times higher than nickel-cadmium batteries, nickel-hydrogen batteries, nickel-zinc batteries, or the like, and rapid charging is possible, active research and development is being carried out for lithium batteries.

Conventional lithium batteries operate at a high driving voltage such that a traditional aqueous electrolyte cannot be used because the lithium anode reacts vigorously with the aqueous solution. Therefore, an organic electrolyte solution in which lithium salt is dissolved in the organic solvent is used in lithium batteries. The organic solvent used may preferably be an organic solvent with a high ion conductivity and permittivity and low viscosity. A single organic solvent satisfying all conditions is difficult to obtain, and therefore, a mixed solvent system such as a high permittivity organic solvent and a low viscosity organic solvent or the like is used.

When a polar, non-aqueous carbonate solvent is used, the anode reacts with the electrolyte in the secondary lithium battery, thereby consuming excess charge. Due to this irreversible reaction, a passivation layer, such as a solid electrolyte interface (SEI), is formed on the surface of the anode. Such an SEI prevents the electrolyte solution from degrading, thereby allowing a stable charge and discharge to be maintained. Moreover, the SEI is an ion tunnel, tunneling and solvating only lithium ions, and preventing intercalation of the organic solvents in the anodes through which the lithium ions move, thereby preventing the anode structure from collapsing.

However, as the charge and discharge of the battery is repeated at a high voltage, i.e., 4V, a rift is gradually formed in the SEI by expansion and contraction of the active materials produced by the charge/discharge process, and the SEI is eventually peeled from the electrode surface. Therefore, as shown in FIG. 1, an electrolyte is in direct contact with the active material, and electrolyte degradation continuously occurs. Once the rift is formed, the rift is continuously developed during the charge/discharge process, thereby deteriorating the active materials. As a result, an SEI made only of a polar solvent and a lithium salt cannot be maintained. Consequently, an internal resistance of the anode increases, resulting in a decrease in the battery capacity. In addition, the electrolyte content decreases due to the degradation of the organic solvent, and the electrolyte within the battery runs out making sufficient ion transfer difficult.

In order to solve the above and/or other problems, direct contact of the anode active material and the electrolyte while keeping lithium ion conductivity from decreasing is in demand so as to improve the charge/discharge properties of a lithium battery.

SUMMARY OF THE INVENTION

Aspects of the present invention provide an organic electrolyte solution which blocks direct contact of the anode active material and the electrolyte while not decreasing the lithium ion conductivity. Aspects of the present invention also provide a lithium battery using the electrolyte solution which has improved cycle properties and life span.

According to an aspect of the present invention, there is provided an organic electrolyte solution including a lithium salt; an organic solvent containing high permittivity solvent; and a vinyl-based compound represented by Formula 1 below:

Formula 1:

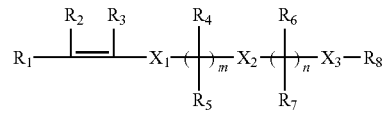

wherein m and n are each independently integers of 1 to 10; $X_1$, $X_2$, and $X_3$ each independently represent O, S, or $NR_9$; and $R_1$, $R_2$, $R_3$, $R_4$, $R_5$, $R_6$, $R_7$, $R_8$, and $R_9$ each independently represent at least one selected from the group consisting of hydrogen atom, halogen atom, hydroxyl group, carboxyl group, amino group, cyano group, substituted or unsubstituted C1-C20 alkyl group, substituted or unsubstituted C1-C20 alkoxy group, substituted or unsubstituted C2-C20 alkenyl group, substituted or unsubstituted C2-C20 alkynyl group, substituted or unsubstituted C6-C30 aryl group, substituted or unsubstituted C7-C30 arylalkyl group, substituted or unsubstituted C7-C30 alkylaryl group, substituted or unsubstituted C1-C20 heteroalkyl group, and substituted or unsubstituted C4-C30 heteroaryl group.

According to another aspect of the present invention, there is provided a lithium battery including a cathode; an anode; and an organic electrolyte solution according to the above.

According to another aspect of the present invention, there is provided an organic electrolyte solution, including a lithium salt; an organic solvent containing a high permittivity solvent; and a vinyl-based compound having a solvophilic functional group including a polar linkage that has an affinity for lithium ions.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
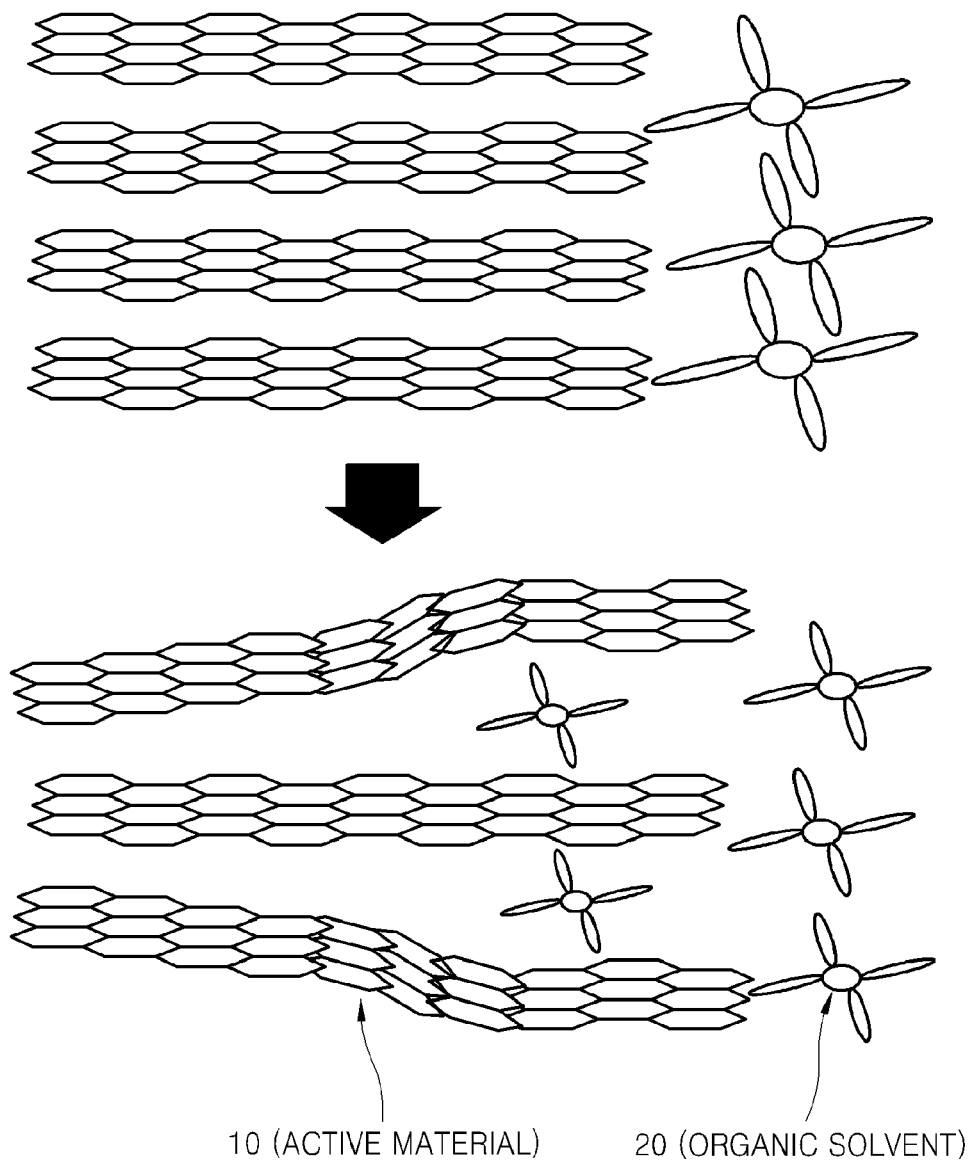
FIG. 1 is a schematic diagram illustrating conventional intercalation of electrolytes.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention provide an organic electrolyte solution including a lithium salt; an organic solvent containing a high permittivity solvent; and a vinyl-based compound represented by Formula 1 below.

Formula 1:

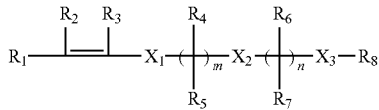

wherein m and n are each independently integers of 1 to 10; $X_1$, $X_2$, and $X_3$ each independently represent O, S, or $NR_9$; and $R_1$, $R_2$, $R_3$, $R_4$, $R_5$, $R_6$, $R_7$, $R_8$, and $R_9$ each independently represent at least one selected from the group consisting of hydrogen atom, halogen atom, hydroxyl group, carboxyl group, amino group, cyano group, substituted or unsubstituted C1-C20 alkyl group, substituted or unsubstituted C1-C20 alkoxy group, substituted or unsubstituted C2-C20 alkenyl group, substituted or unsubstituted C2-C20 alkynyl group, substituted or unsubstituted C6-C30 aryl group, substituted or unsubstituted C7-C30 arylalkyl group, substituted or unsubstituted C7-C30 alkylaryl group, substituted or unsubstituted C1-C20 heteroalkyl group, and substituted or unsubstituted C4-C30 heteroaryl group.

Figure 2:
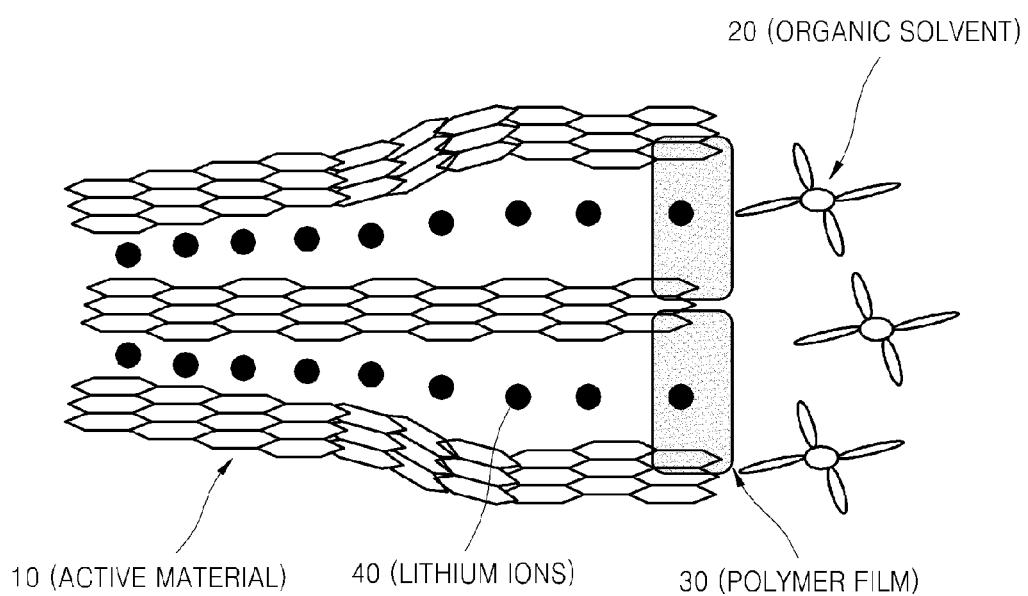
FIG. 2 is a schematic diagram illustrating an operating mechanism of a polymer film according to aspects of the present invention.

The vinyl-based compound of Formula 1 included in the organic electrolyte solution is grafted on the surface of an anode for a lithium battery by receiving electrons from a potential higher than an intercalation potential of the organic solvent including the high permittivity solvent, and the vinyl group is polymerized to form a polymer film 30. The polymer film 30 formed as such, as shown in FIG. 2, blocks the direct contact between the anode active material 10 and the electrolyte, thereby suppressing a continuous intercalation of the organic solvents 20 in the anode interlayer structure. A rift that may form from the change in anode active material 10 volume during lithium absorption and release is suppressed. Although described and shown as the polymer film 30 blocking intercalation of the organic solvents 20 into the anode active material 10, the vinyl-based compound according to aspects of the present invention also prevents deterioration of a cathode active material disposed on the cathode.

Furthermore, a solvophilic functional group of the vinyl-based compound of Formula 1 includes a polar linkage having an affinity for lithium ions. Therefore, the electrolyte included in the electrolyte solution and the lithium ions more easily diffuse into the inner part of the polymer film. Even in the case in which a polymer film 30 (a type of passivation layer) formed of the vinyl-based compound exists in the electrolyte solution, lithium ions 40 diffuse into the interior of the polymer film 30 with ease, thereby continuously permeating the anode active material 10 with the lithium ions 40 so as to improve the charge/discharge efficiency, as shown in FIG. 2. In FIG. 2, the organic solvent 20 is blocked from diffusing into the anode active material 10 while the lithium ions 40 diffuse therein.

According to an embodiment of the present invention, an example of the vinyl-based compound of Formula 1 above may be represented by Formula 2 below:

Formula 2:

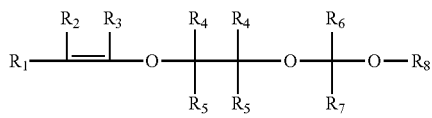

wherein $R_1$, $R_2$, $R_3$, $R_4$, $R_5$, $R_6$, $R_7$, and $R_8$ are each independently one selected from the group consisting of hydrogen atom, halogen atom, hydroxyl group, carboxyl group, amino group, cyano group, substituted or unsubstituted C1-C20 alkyl group, substituted or unsubstituted C1-C20 alkoxy group, substituted or unsubstituted C2-C20 alkenyl group, substituted or unsubstituted C2-C20 alkynyl group, substituted or unsubstituted C6-C30 aryl group, substituted or unsubstituted C7-C30 arylalkyl group, substituted or unsubstituted C7-C30 alkylaryl group, substituted or unsubstituted C1-C20 heteroalkyl group, and substituted or unsubstituted C4-C30 heteroaryl group.

According to an embodiment of the present invention, an example of the vinyl-based compound may be represented by 1-[2-(1-methoxyethoxy)ethoxy]ethylene of Formula 3 below:

Formula 3:

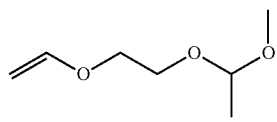

Besides the compound of Formula 3 above, other compounds represented by Formulas 4 through 8 below may also be used as additives:

Formula 4:

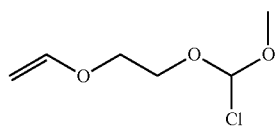

Formula 5:

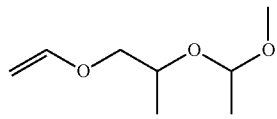

Formula 6:

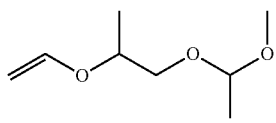

Formula 7:

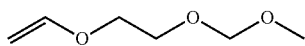

Formula 8:

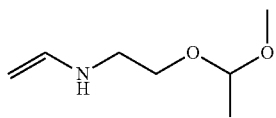

The C1-C20 alkyl group used as a substituent group according to aspects of the present invention may have a straight chain or branched structure, and preferably be C1-C12, more preferably be C1-C8, and most preferably be C1-C4 alkyl group. Specific examples include methyl, ethyl, propyl, isobutyl, sec-butyl, tert-butyl, pentyl, iso-amyl, and hexyl, and at least one hydrogen atom included in the alkyl group may be substituted by halogen atom, hydroxyl group, nitro group, or cyano group.

The C1-C20 alkoxy group used as a substituent group according to aspects of the present invention is in the form of —O-alkyl, and the oxygen atom is linked to the main chain. The alkoxy group may preferably be C1-C12, and more preferably be C1-C8, and most preferably be C1-C4 alkoxy group. Examples of such alkoxy group may include methoxy group, ethoxy group, and propoxy group, and at least one hydrogen atom included in the alkoxy group may be substituted by one of halogen atom, hydroxyl group, nitro group, cyano group, and the like.

The C2-C20 alkenyl group used as a substituent group according to aspects of the present invention may have a straight chain or branched structure, and may have at least one unsaturated double bond within the alkyl group previously defined. At least one hydrogen atom included in the alkenyl group may be substituted by one of halogen atom, hydroxyl group, nitro group, cyano group, and the like.

The C2-C20 alkynyl group used as a substituent group according to aspects of the present invention may have a straight chain or branched structure, and may have at least one unsaturated triple bond within the alkyl group previously defined. At least one hydrogen atom included in the alkenyl group may be substituted by one of halogen atom, hydroxyl group, nitro group, cyano group, and the like.

The C6-C30 aryl group used as substituent group according to aspects of the present invention includes a carbocycle aromatic system including at least one aromatic ring, and may preferably be C6-C20 aryl group, and more preferably is C6-C10. The aromatic rings may be attached together by a pendant method or be fused. At least one hydrogen atom included in the aryl group may be substituted by one of halogen atom, hydroxyl group, nitro group, cyano group, and the like. Specific examples of such aryl groups include phenyl group, halophenyl group (such as o-, m-, and p-fluorophenyl group, dichlorophenyl group), cyano group, dicyanophenyl group, trifluoromethoxyphenyl group, biphenyl group, halobiphenyl group, cyanobiphenyl group, C1-C10 biphenyl group, C1-C10 alkoxybiphenyl group, o-, m-, and p-tolyl group, o-, m-, and p-cumenyl group, mesityl group, phenoxyphenyl group, (α,α'-dimethylbenzene)phenyl group, (N,N'-dimethyl)aminophenyl group, (N,N'-diphenyl)aminophenyl group, pentalenyl group, indenyl group, naphthyl group, halonaphthyl group (such as fluoronaphthyl group), C1-C10 alkylnaphthyl group (such as methylnaphthyl group), C1-C10 alkoxynaphthyl group (such as methoxynaphthyl group), cyanonaphthyl group, anthracenyl group, azulenyl group, heptalenyl group, acenaphthylenyl group, phenalenyl group, fluorenyl group, anthraquinonyl group, methylanthryl group, phenanthryl group, triphenylene group, pyrenyl group, chrysenyl group, ethyl-chrysenyl group, picenyl group, perilenyl group, chloroperilenyl group, pentaphenyl group, pentacenyl group, tetraphenylenyl group, hexaphenyl group, hexacenyl group, rubicenyl group, coroneryl group, trinaphthylenyl group, heptaphenyl group, heptacenyl group, pyranthrenyl group, and oparenyl group.

The C7-C30 alkylaryl group used as a substituent according to aspects of the present invention has at least one hydrogen atom of the C6-C30 aryl group as described above substituted with an alkyl group. A benzyl group may be an example, but aspects of the present invention are not limited thereto. At least one hydrogen atom included in the alkylaryl group may be substituted by one of halogen atom, hydroxyl group, nitro group, cyano group, and the like. Examples of such group may be 4-tert-butylphenyl group and 4-ethylphenyl group, but are not limited thereto. At least one hydrogen atom included in the arylalkyl group may be substituted by one of halogen atom, hydroxyl group, nitro group, cyano group, and the like.

The C1-C20 heteroalkyl group used as a substituent according to aspects of the present invention includes a heteroatom, such as oxygen atom, nitrogen atom, sulfur atom, and phosphorous atom, within the main chain of the C1-C20 alkyl group as described above. At least one hydrogen atom included in the heteroalkyl group may be substituted by one of halogen atom, hydroxyl group, nitro group, cyano group, and the like.

The C4-C30 heteroaryl group used as a substituent according to aspects of the present invention includes a system formed of at least one aromatic ring including at least one heteroatom selected from oxygen atom, nitrogen atom, sulfur atom, and phosphorous atom, wherein the remaining atoms of the aromatic ring are carbon atoms. Further, when the at least one aromatic ring includes at least two aromatic rings, the at least two aromatic rings may be fused together or linked by a single bond. At least one hydrogen atom included in the heteroaryl group may be substituted by one of halogen atom, hydroxyl group, nitro group, cyano group and the like.

In the case where at least one hydrogen atom within the vinyl-based compound of Formula 1 above is substituted with a halogen atom, a surface activity of the vinyl-based compound may be enhanced. In the case where a surface active compound is substituted with a halogen atom, such as fluorine, the surface activity may be further enhanced.

The method of forming the compound of Formula 3 according to an embodiment of the present invention on the surface of an anode explained in more detail with reference to a reaction equation is as follows. As shown in the following Reaction Equation 1, 1-[2-(1-methoxyethoxy)ethoxy]ethylene compound first receives an electron to be separated into two radicals, and the divided methoxyethylene radicals form a bond with the vinyl group and polymerize to form a polymer film on the surface of the anode. The polymer film prevents direct contact between the anode active material and the electrolyte and suppresses continuous intercalation of the organic solvent into the anode interlayer structure. The polymer film thereby decreases the occurrence of rifts due to a volume change of the anode active layer during the adsorption/discharge of lithium.

Reaction Equation 1:

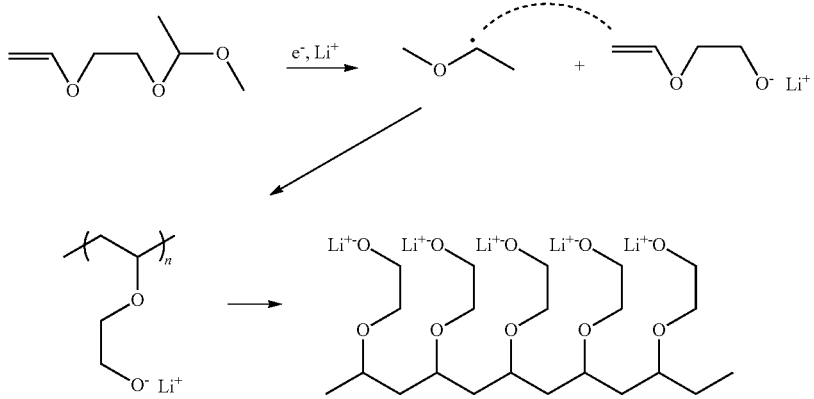

In the organic electrolyte solution, the content of the compound represented by Formula 1 above may be 0.5 to 60 parts by weight, and preferably 3 to 20 parts by weight, based on 100 parts by weight of the organic solvent including the high permittivity solvent. If the content is lower than 0.5 parts by weight, any improvement of the charge/discharge properties is insufficient, and if the content is higher than 60 parts by weight, ion conductivity may decrease due to high viscosity.

The organic solvent included in the organic electrolyte solution according to aspects of the present invention may include a high permittivity solvent, which is not particularly limited. Examples of such solvent include cyclic carbonates, such as ethylene carbonate, propylene carbonate, and butylene carbonate, and γ-butylactone. Among the above, propylene carbonate is preferable with regard to safety at high voltage.

In addition to the aforementioned high permittivity solvent, the organic solvent may further include a low-boiling point solvent, which may be a low-boiling point solvent, such as chain-type carbonates including dimethyl carbonate, ethylmethyl carbonate, diethyl carbonate, and dipropyl carbonate, dimethoxy ethane, diethoxyethane, or fatty acid ester derivatives, but aspects of the present invention are not limited thereto. When a mixture of the high permittivity solvent and the low-boiling point solvent is used as the organic solvent, the mixing ratio may be 1:1 to 1:9 by volume. If the ratio is outside of this range, the discharge capacity and the charge/discharge life span may not be desirable.

Moreover, the lithium salt included in the organic electrolyte solution may be used without limits and may be at least one selected from the group comprising $LiClO_4$, $LiCF_3SO_3$, $LiPF_6$, $LiN(CF_3SO_2)$, $LiBF_4$, $LiC(CF_3SO_2)_3$, and $LiN(C_2F_5SO_2)_2$. The concentration of the lithium salt within the organic electrolyte solution may be 0.5 to 2M. If the concentration is lower than 0.5M, the conductivity of the electrolyte solution decreases, thereby deteriorating the quality of the electrolyte solution; and if the concentration is higher than 2.0M, the viscosity of the electrolyte solution increases, thereby decreasing the mobility of the lithium ions, which is not desirable.

If the lithium salt is $LiClO_4$, the organic electrolyte solution according to aspects of the present invention, may be formed such that the high permittivity solvent is propylene carbonate, and the vinyl-based compound represented Formula 1 is 1-[2-(1-methoxyethoxy)ethoxy]ethylene of Formula 3.

Hereinafter, a lithium battery using the organic electrolyte solution described above and a method of manufacturing the lithium battery will be described. The lithium battery according to aspects of the present invention includes a cathode, an anode, and an organic electrolyte solution, wherein the organic electrolyte solution includes lithium salt, a high permittivity solvent-containing organic solvent, and a vinyl-based compound of Formula 1. The lithium battery according to aspects of the present invention does not have a particularly limited structure, and lithium secondary batteries such as lithium ion batteries, lithium-ion polymer batteries, and lithium-sulfur batteries, as well as lithium primary batteries may be used.

The lithium battery according to aspects of the present invention may be manufactured as follows. First, a cathode active material, a conductive agent, a binding agent, and a solvent are mixed to prepare a cathode active material composition. The cathode active material composition may either be directly coated on an aluminum current collector and dried to prepare a cathode plate, or the cathode active material composition is cast on a separate support, followed by laminating the film from the support on the aluminum current collector to produce a cathode. The cathode active material may be a lithium-containing metal oxide and may include $LiCoO_2$, $LiMn_xO_{2x}$, $LiNi_{1-x}Mn_xO_{2x}$ (x=1, 2), and $Li_{1-x-y}Co_xMn_yO_2 (0 \leq x \leq 0.5, 0 \leq y \leq 0.5)$.

Carbon black may be used as the conductive agent. The binding agent may be vinylidene fluoride/hexafluoropropylene copolymer, polyvinylidenefluoride (PVdF), polyacrylonitrile, polymethylmethacrylate (PMMA), polytetrafluoroethylene, mixtures thereof, or styrene butadiene rubber-based polymer. The solvent may be N-methylpyrrolidone (NMP), acetone, or water. Here, the contents of the cathode active material, the conductive agent, the binding agent, and the solvent used may be those conventionally used.

Using the similar processes of manufacturing the cathode plate described above, an anode active material composition is prepared by mixing anode active material, conductive agent, binding agent, and the solvent, and the resultant product is either directly coated on a copper current collector, or cast on a separate support, and then the anode active material film from the support is laminated on the copper current collector to obtain an anode plate. Here, the contents of the anode active material, the conductive agent, the binding agent, and the solvent used may follow the convention. For the anode active material, silicon metal, silicon film, lithium metal, lithium alloy, carbon material, or graphite may be used.

The conductive agent, the binding agent, and the solvent within the anode active material composition may be the same as those used for the cathode. If necessary, a plasticizer may be added to the cathode active material composition and the anode active material composition to form pores within the electrode plates.

As a separator, any material conventionally used for lithium batteries may be used. Particularly, a separator with superior electrolyte solution hydrating capacity and with a low resistance against electrolyte ion mobility is desirable. For example, glass fiber, polyester, Teflon®, polyethylene, polypropylene, polytetrafluoroethylene (PTFE), or a combination thereof may be used, including both a woven and non-woven network. In more detail, lithium ion batteries may use a separator that can be coiled, such as polyethylene and polypropylene, and lithium ion polymer batteries may use a separator with superior ability to impregnate organic electrolyte solutions, and such separators can be manufactured according to the following method.

A polymer resin, a filler, and a solvent are mixed to produce a separator composition. The separator composition may be either directly coated on the electrodes and dried to form a separator film, or the separator composition may be cast on a support, dried, and then removed from the support to be laminated on the electrodes. The polymer resin is not particularly limited insofar as the resin is used in a binding agent of the electrodes. For example, vinylidene fluoride/hexafluoropropylene copolymer, polyvinylidene fluoride, polyacrylonitrile, polymethylmethacrylate, or a blend thereof may be used. In particular, it is desirable to use vinylidene fluoride/hexafluoropropylene copolymer with the content of the hexafluoropropylene of 8 to 25 wt %.

The separator is interposed between the cathode plate and the anode plate, and a battery structure is formed. Such a battery structure can be wound or folded to be placed into a cylindrical battery case or an angular battery case, and then the organic electrolyte solution according to aspects of the present invention is injected to complete the lithium ion battery. In addition, the battery structure can be stacked into a bi-cell structure, which can be impregnated with the organic electrolyte solution according to aspects of the present invention, placed in a pouch, and sealed to complete a lithium-ion polymer battery.

Figure 3:
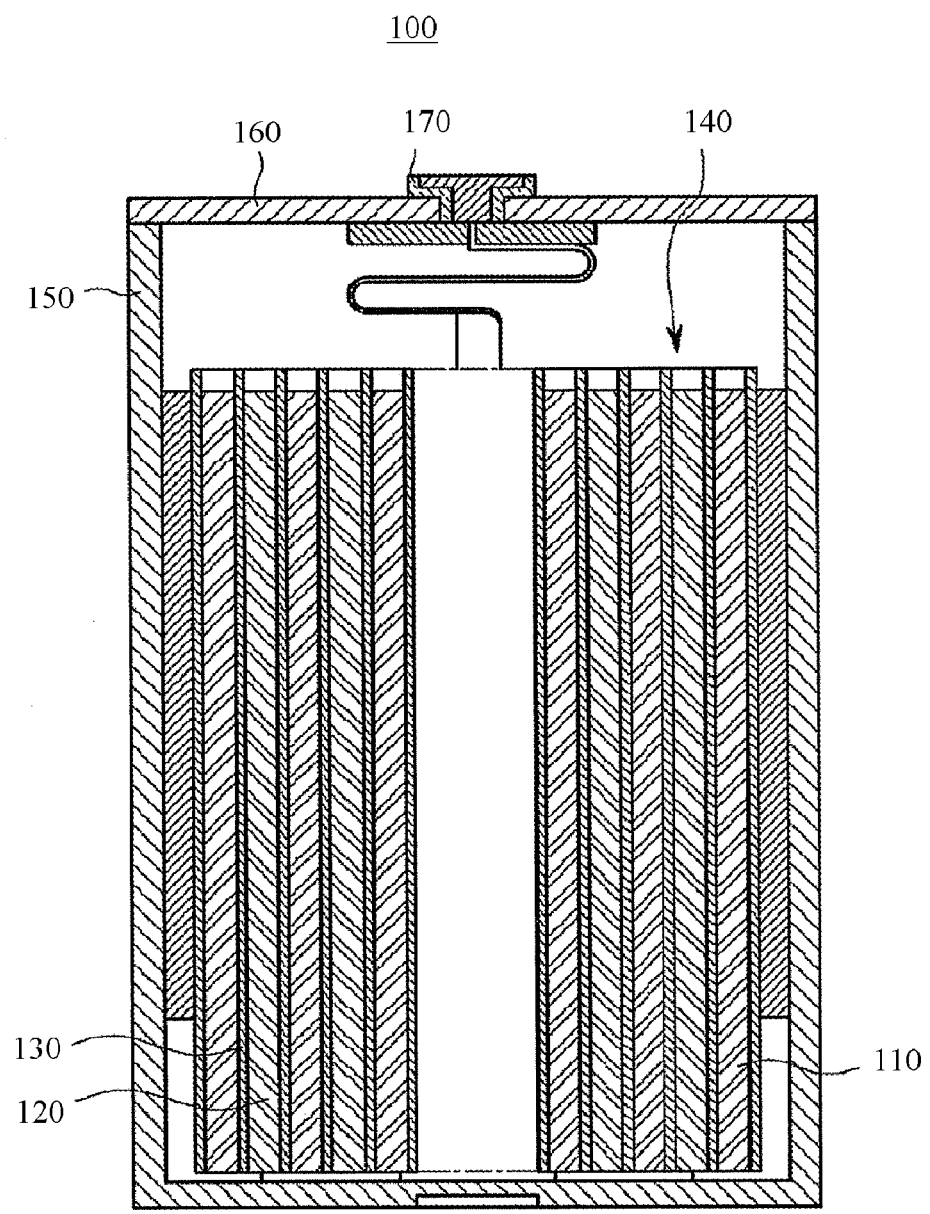
FIG. 3 shows a lithium battery according to an exemplary embodiment of the present invention.

FIG. 3 shows a lithium battery 100, according to an exemplary embodiment of the present invention. As shown in FIG. 3, the lithium battery 100 includes an electrode assembly 140, including an anode electrode 110, a cathode electrode 120, and a separator disposed therebetween. The electrode assembly 140 is disposed inside a case 150, and then an electrolyte (organic electrolyte solution) is injected into the case 150. The case 150 is sealed using a cap plate 160 and a gasket 170.

Hereinafter, aspects of the present invention are described in more detail with reference to exemplary embodiments, but the aspects of present invention are not limited thereto.

EXAMPLE 1

Preparation of Electrolyte Solution 1 wt % of 1-[2-(1-methoxyethoxy)ethoxy]ethylene of Formula 3 below, as an additive, and 1M of LiClO$_4$, as a lithium salt, were added to an organic solvent made of propylene carbonate to prepare an organic electrolyte solution.

Formula 3:

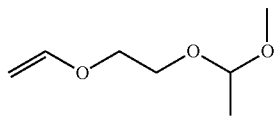

EXAMPLE 2

Preparation of Electrolyte Solution 3 wt % of 1-[2-(1-methoxyethoxy)ethoxy]ethylene of Formula 3 above, as an additive, and 1M of LiClO$_4$, as a lithium salt, were added to an organic solvent made of propylene carbonate to prepare an organic electrolyte solution.

EXAMPLE 3

Preparation of Electrolyte Solution 5 wt % of 1-[2-(1-methoxyethoxy)ethoxy]ethylene of Formula 3 above, as an additive, and 1M of LiClO$_4$, as a lithium salt, were added to an organic solvent made of propylene carbonate to prepare an organic electrolyte solution.

EXAMPLE 4

Preparation of Electrolyte Solution 10 wt % of 1-[2-(1-methoxyethoxy)ethoxy]ethylene of Formula 3 above, as an additive, and 1M of LiClO$_4$, as a lithium salt, were added to an organic solvent made of propylene carbonate to prepare an organic electrolyte solution.

EXAMPLE 5

Preparation of Electrolyte Solution 20 wt % of 1-[2-(1-methoxyethoxy)ethoxy]ethylene of Formula 3 above, as an additive, and 1M of LiClO$_4$, as a lithium salt, were added to an organic solvent made of propylene carbonate to prepare an organic electrolyte solution.

COMPARATIVE EXAMPLE 1

Preparation of Electrolyte Solution 1M of LiClO$_4$, was added as a lithium salt to an organic solvent made of propylene carbonate, to prepare an organic electrolyte solution.

EXAMPLE 6

Manufacture of Lithium Ion Battery

A graphite powder MCMB (mesocarbon microbeads from Osaka Gas Chemicals Co.) and a binding agent of N-methylpyrrolidone (NMP) with polyvinylidene fluoride (PVDF) dissolved at 5 wt % were added to an agate mortar at a weight ratio of 95:5 respectively, and were mixed thoroughly to form a slurry.

The slurry was cast on a copper foil to a thickness of 19 μm, with a doctor blade at a length of 100 μm to obtain an anode, and the resultant product was placed in an oven at 90° C. and was dried for 2 hours to evaporate the NMP, and was then dried for 2 hours in an oven at 120° C. to dry the NMP. Then, the electrode was mill-rolled to obtain an anode with a thickness of 60 μm.

Using the anode as formed above and lithium metal as a counter electrode, polyethylene as the separator, and the organic electrolyte solution of Example 1, a 2016-type coin cell was manufactured.

EXAMPLE 7

Manufacture of Lithium Ion Battery

A coin cell was manufactured using the same method as in Example 6 above, except that the organic electrolyte solution of Example 2 was used.

EXAMPLE 8

Manufacture of Lithium Ion Battery

A coin cell was manufactured using the same method as in Example 6 above, except that the organic electrolyte solution of Example 3 was used.

EXAMPLE 9

Manufacture of Lithium Ion Battery

A coin cell was manufactured using the same method as in Example 6 above, except that the organic electrolyte solution of Example 4 was used.

EXAMPLE 10

Manufacture of Lithium Ion Battery

A coin cell was manufactured using the same method as in Example 6 above, except that the organic electrolyte solution of Example 5 was used.

COMPARATIVE EXAMPLE 2

Manufacture of Lithium Ion Battery

A coin cell was manufactured using the same method as in Example 6 above, except that the organic electrolyte solution of Comparative Example 1 was used.

EXPERIMENT EXAMPLE 1

Charge/Discharge Testing of Batteries

The coin cells of Examples 7 to 10 and Comparative Example 2 with cell capacity of 1.54 mAh were charged under constant-current at a 0.1 C rate until 0.001V was reached against the Li electrode, then the coin cells of Examples 7 to 10 and Comparative Example 2 were charged under constant-voltage at 0.001V until the current reached 0.02 C rate against the cell capacity. Consequently, a constant-current discharge was performed to the charged coin cells at a 0.1 C rate of the coin cell until the voltage reached 1.5V, from which the charge/discharge capacity was obtained. Charge/discharge efficiencies were calculated from the charge/discharge capacity. Charge/discharge efficiency was calculated according to the Mathematical Formula 1 below:

Initial charge/discharge efficiency(%)=Discharge capacity of 1$^{st}$ cycle/charge capacity of 1$^{st}$ Cycle                          Mathematical Formula 1

The calculated results are shown in Table 1 below:

TABLE 1

| | First Cycle | | |
|---|---|---|---|
| Samples | Charge Capacity (mAh) | Discharge Capacity (mAh) | Initial Charge/Discharge Efficiency (%) |
| Example 7 | 2.23 | 1 | 48 |
| Example 8 | 1.85 | 1.2 | 65 |
| Example 9 | 1.53 | 1.2 | 79 |
| Example 10 | 1.48 | 1.3 | 88 |
| Comparative Example 2 | — | — | — |

It can be seen from Table 1 that, charge/discharge occurred reversibly for the coin cells manufactured according to Examples 7 to 10 which used the vinyl-based additive of Formula 1, and in particular, Example 10 showed an initial charge/discharge efficiency value of 88%. However, in the case of Comparative Example where the additive was not used, the solvent was degraded by intercalation resulting in a production of a nonfunctional battery.

The organic electrolyte solution according to aspects of the present invention and a lithium battery using the same uses a vinyl-based compound represented by Formula 1 as an additive to suppress a formation of rifts in the anode active material during battery charge/discharge, thereby providing superior charge/discharge properties, stability, reliability, and high charge/discharge efficiency of the battery.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An organic electrolyte solution, comprising:
   a lithium salt;
   an organic solvent containing a high permittivity solvent; and
   a vinyl-based compound represented by Formula 1 below:

Formula 1:

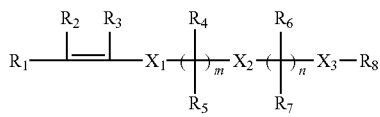

wherein m and n are each independently integers of 1 to 10, $X_1$, $X_2$, and $X_3$ each independently represent O, S, or $NR_9$, $R_1$, $R_2$, $R_3$, $R_4$, $R_5$, $R_6$, $R_7$, $R_8$, and $R_9$ each independently represent at least one selected from the group consisting of a hydrogen atom, a halogen atom, a hydroxyl group, a carboxyl group, an amino group, a cyano group, a substituted or unsubstituted C1-C20 alkyl group, a substituted or unsubstituted C1-C20 alkoxy group, a substituted or unsubstituted C2-C20 alkynyl group, a substituted or unsubstituted C6-C30 aryl group, a substituted or unsubstituted C7-C30 arylalkyl group, a substituted or unsubstituted C7-C30 alkylaryl group, a substituted or unsubstituted C1-C20 heteroalkyl group, and a substituted or unsubstituted C4-C30 heteroaryl group.

2. The organic electrolyte solution of claim 1, wherein the vinyl-based compound of Formula 1 is a compound represented by Formula 2 below:

Formula 2:

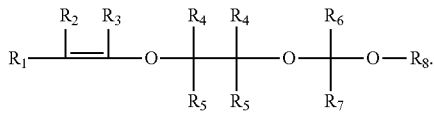

3. The organic electrolyte solution of claim 1, wherein the vinyl-based compound of Formula 1 is a compound represented by Formula 3 below:

Formula 3:

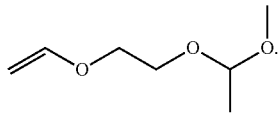

4. The organic electrolyte solution of claim 1, wherein the vinyl-based compound has a content of 0.5 to 60 parts by weight based on 100 parts by weight of the organic solvent.

5. The organic electrolyte solution of claim 1, wherein the vinyl-based compound has a content of 1 to 20 parts by weight based on 100 parts by weight of the organic solvent.

6. The organic electrolyte solution of claim 1, wherein the high permittivity solvent is at least one selected from the group consisting of ethylene carbonate, propylene carbonate, butylene carbonate, and γ-butylactone.

7. The organic electrolyte solution of claim 1, wherein the high permittivity solvent is propylene carbonate.

8. The organic electrolyte solution of claim 1, wherein the organic solvent further comprises a low boiling point solvent.

9. The organic electrolyte solution of claim 1, wherein the organic solvent further comprises a low boiling point solvent, and the low boiling point solvent is at least one selected from the group consisting of dimethyl carbonate, ethylmethyl carbonate, diethyl carbonate, dipropyl carbonate, dimethoxyethane, diethoxyethane, and a fatty acid ester derivative.

10. The organic electrolyte solution of claim 1, wherein the organic solvent further comprises a low boiling point solvent, and a mixing ratio of the high permittivity solvent and the low-boiling point solvent is 1:1 to 1:9 by volume.

11. A lithium battery, comprising:
a cathode;
an anode; and
the organic electrolyte solution according to claim 1.

12. The lithium battery of claim 11, where in the lithium battery is a secondary lithium battery.

* * * * *